C. H. KEWELL.
SPINNER.
APPLICATION FILED SEPT. 10, 1919.

1,389,763.

Patented Sept. 6, 1921.

Inventor
Charles H. Kewell
By Lincoln Sonntag
Attorney

UNITED STATES PATENT OFFICE.

CHARLES H. KEWELL, OF SAN FRANCISCO, CALIFORNIA.

SPINNER.

1,389,763.     Specification of Letters Patent.     Patented Sept. 6, 1921.

Application filed September 10, 1919. Serial No. 323,014.

*To all whom it may concern:*

Be it known that I, CHARLES H. KEWELL, a citizen of the United States, and residing at the city of San Francisco, in the county of San Francisco and State of California, have invented certain new and useful Improvements in Spinners, of which the following is a specification.

My invention relates to improvements in spinners.

The object of my invention is to provide an improved spinner whereby wood or other absorbent material may be used thereon to imitate salmon eggs, which are especially valuable as bait, instead of glass beads as heretofore. For example, wood has a number of advantages over glass for the purpose mentioned, among which may be stated its lightness, its less liability to breaking, and the fact that it will readily admit of painting any color or shade desired. In order to make the use of wood or other absorbent material practicable, inasmuch as the imitation eggs must be attached to the device by boring therethrough, it will be necessary that the orifice be rendered waterproof, and the means which I employ for this purpose form one of the important advantages of my invention.

Referring to the accompanying drawing illustrating my invention,

Figure 1:
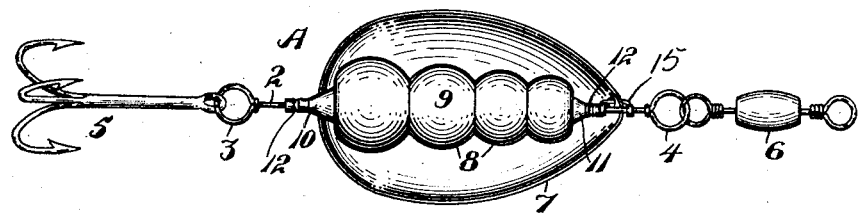
Figure 1 shows a side view of my improved spinner.

A represents the spinner having the usual shank portion 2, on the ends of which are formed eyes 3 and 4 in which are mounted the shank of hooks 5 and swivel 6, and on the shank portion 2 can revolve the spoon 7.

Instead of mounting glass beads on the shank portion to imitate salmon eggs, I prefer to form the imitation eggs from a piece of wood 9, the eggs being designated 8, and to prevent water entering between the bore of the wood 9 and the shank portion 2, I place sealing sleeves 10 and 11 at each end of the piece of wood and sink the inner ends thereof into the wood and then crimp the sleeve to the shank portion 2 as shown at 12.

Painting the said material completes the waterproofing.

Figure 2:
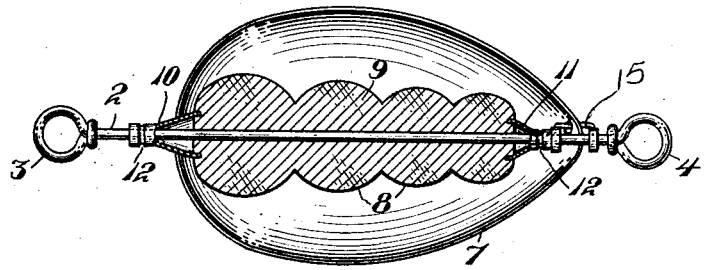
Fig. 2 is a view of the spinner showing the imitation eggs and the means for rendering them waterproof in section.

The spoon is rotatably secured to the shaft 2 by means of a loop connected to the shaft and running through an opening in the spoon as shown. The sealing sleeves 10 and 11 are tapered from the imitation eggs 9 as shown in Figs. 1 and 2 of the drawing so as to minimize the disturbance of the water in drawing the spinner therethrough, thereby tending to prevent alarm of the fish.

The spoon 7 is pivotally mounted at one end to the shaft 2 by means of a U-shaped loop or link 15, the said link or loop being turnable with said spoon on said shaft 2.

The enlarged ends of sleeves 10 and 11 are embedded in the member 9 as shown and the smaller ends fit the shaft 2 so snugly that water is prevented from entering the bore of said member 9.

I claim:—

1. In a spinner a spoon, water-proofed material integrally formed to resemble a plurality of roundish eggs of various sizes, and having a central opening therethrough, and being within the wall of said spoon, a shaft extending through said central opening, and an outwardly tapered sleeve upon said shaft at each end of said material and secured thereto.

2. In a spinner water-proofed material formed to resemble a plurality of roundish eggs of various sizes, and having a central opening therethrough, a shaft extending through said central opening, and an outwardly tapered sleeve upon said shaft at each end of said material on said shaft and secured to said end.

In testimony whereof I affix my signature.

CHARLES H. KEWELL.